United States Patent [19]

Payne et al.

[11] 4,272,309
[45] Jun. 9, 1981

[54] PROCESS FOR MOLDING REINFORCED ARTICLES

[75] Inventors: Roger E. Payne; Robert K. Rossi, both of Akron, Ohio; James B. Knizely, Middlebury, Conn.

[73] Assignee: The Goodyear Tire & Rubber Company, Akron, Ohio

[21] Appl. No.: 145,477

[22] Filed: May 1, 1980

[51] Int. Cl.³ .............................................. B29H 17/00
[52] U.S. Cl. ................................... 156/117; 156/125; 156/128 N; 156/137; 264/255; 264/279; 264/326; 264/225
[58] Field of Search ............ 152/357 A; 156/110 CL, 156/117, 125, 128, 137, 140; 264/501, 241, 250, 251, 255, 257, 259–262, 267, 271, 275, 277, 279, 326, 219, 224, 225

[56] References Cited

U.S. PATENT DOCUMENTS

| | | | |
|---|---|---|---|
| 2,902,072 | 9/1959 | Reuter | 152/330 |
| 3,278,668 | 10/1966 | Eldred | 264/219 |
| 3,344,006 | 9/1967 | Barassi et al. | 156/128 R |
| 3,427,213 | 2/1969 | Alderfer | 264/241 X |
| 3,555,140 | 1/1971 | Argereu | 264/255 |
| 3,701,374 | 10/1972 | McGillvary | 152/330 R |
| 3,888,291 | 6/1975 | Herzlich et al. | 152/357 A |
| 4,044,811 | 8/1977 | Dudek et al. | 152/357 A |
| 4,049,767 | 9/1977 | Vaidya | 264/257 |
| 4,088,523 | 5/1978 | Gallizia et al. | 264/275 X |
| 4,230,511 | 10/1980 | Olsen | 156/123 R |

Primary Examiner—John E. Kittle

Attorney, Agent, or Firm—Frederick K. Lacher; H. C. Young, Jr.

[57] ABSTRACT

A reinforcing cord is positioned in a mold cavity for reinforcing an annular article such as a tire by wrapping the cord on an annular spacer band which is supported on a mold core and then placed in the mold. The mold is charged with a liquid polyurethane reaction mixture to form an outer polymeric ring of the annular article which is adhered to the cord and partially cured. The spacer band is removed, the mold closed and charged with additional liquid polyurethane reaction mixture to form an inner polymeric ring of the annular article adjacent the reinforcing cord carried by the outer ring. The partially cured outer ring and the inner ring are then cured to adhere the inner ring to the outer ring with the layer of reinforcing cord encapsulated between the rings. An additional layer of reinforcing cord may be positioned in the article by wrapping another cord around a second spacer band having a smaller diameter than the first spacer band. The second spacer band is placed in a mold and defines a cavity between the spacer band and the outer ring. The mold is then charged with additional liquid reaction mixture to form the second polymeric ring and encapsulate the cord on the second spacer ring and partially cure the second ring for adherence to the first ring. The second spacer band is then removed and the mold charged with additional liquid reaction mixture to form the radially innermost third polymeric ring. The reaction mixture of the second and third rings are then cured to provide adherence between the adjacent rings.

29 Claims, 21 Drawing Figures

PROCESS FOR MOLDING REINFORCED ARTICLES

FIELD OF INVENTION

This invention relates to a process for molding reinforced articles of a polymeric material. The invention further relates to a method of preparing a cord-reinforced tread, particularly a removable tread, in the form of a belt for a torus tire. The invention additionally relates to the combination of said tire and tread where said tread is optionally removable.

BACKGROUND OF THE INVENTION

Heretofore, tire treads of the removable type have generally been made from rubber reinforced with plies of cords either of steel or textile material. Such removable treads have been made by conventional methods in which at least one layer of rubber containing cord reinforcement has been wrapped around a building drum to form a belt after which it is placed in a mold and vulcanized.

With a cast polyurethane torus tire tread, the polyurethane can be poured or injected into a mold in a liquid state and, accordingly, there is a problem in positioning the reinforcing cords and obtaining adhesion between the polyurethane and the reinforcing cords. The cords can be wrapped around the inner core of a mold; however, reinforcing cords at that position present problems in providing the strength and wear properties which are necessary for a tread of this type. The cords may also be spaced from the inner core by spacing members interposed between the inner core and the reinforcing wire cords. This is not desirable when the liquid polyurethane is injected into the mold because these spacing members will remain in the tread and may weaken the tread or provide channels through which moisture can reach the wire cords.

Therefore, it is an object of this invention to provide a method of making a molded article having a cord reinforcement positioned therein.

Another object is to provide a method of making a cast annular, cord-reinforced tread belt for a tire, preferably of the pneumatic type in which the cord is positioned during the casting operation by a spacer which does not become a part of the tread belt.

A further object is to provide a method of making a cast tire in which reinforcing cord is positioned in and adhered to the outer tread portion in the tire mold prior to injection of the polyurethane material for the remainder of the tire.

DISCLOSURE AND PRACTICE OF THE INVENTION

In accordance with one aspect of this invention, a method is provided of preparing a reinforced annular shaped article of elastomeric material in a mold, said mold having a generally cylindrical collapsible radially inner core member and a shell member positioned radially outward of the surface of said core member to define a cavity between said shell member and said core member, which method comprises the steps of:

(a) mounting a spacer band with a radially outer groove thereon around the radially outer surface of said core member;

(b) wrapping a reinforcing cord around said spacer band and in said groove;

(c) positioning said outer shell member radially outward of said core member to define an outer cavity between said band and said outer shell member;

(d) charging a liquid reaction mixture into said outer cavity and at least partially curing said mixture to form an outer polymeric ring of said article adhered to said reinforcing cord;

(e) collapsing and removing said inner collapsible core member and said spacer band from said outer shell member containing said outer polymeric ring and reinforcing cord;

(f) positioning said collapsible core member radially inward of said outer shell member to define an inner cavity between said outer polymeric ring and said core member;

(g) charging a liquid reaction mixture into said inner cavity and at least partially curing said mixture to form an inner polymeric ring of said article adhered to said reinforcing cord and said outer polymeric ring while further curing said outer ring; and (h) removing said core member and said outer shell member from said cord-reinforced annular shaped article.

In accordance with another aspect of this invention, a method is provided of preparing a reinforced annular tire of elastomeric material in a tire mold, said mold having a pair of side plates, and a collapsible radially inner tire mold core member which comprises the steps of:

(a) preparing an outer ring of a tread belt member in a tread mold with a removable, generally cylindrical tread mold core member and a radially outer shell member positioned radially outward of the surface of said core member to define a cavity between said shell member and said core member including the steps of:
  (1) mounting a spacer band with a radially outer groove thereon around a radially outer surface of said tread mold core member,
  (2) wrapping a reinforcing cord around said spacer band and in said groove,
  (3) positioning said outer shell member radially outward of said tread mold core member to define an outer cavity between said band and said outer shell member,
  (4) charging a liquid reaction mixture into said outer cavity and partially curing said mixture to form an outer polymeric ring of said tread belt member adhered to said reinforcing cord,
  (5) collapsing and removing said tread mold core member and said spacer band from said outer shell member containing said outer polymeric ring and reinforcing cord;

(b) positioning said outer shell member between said pair of side plates and around said collapsible tire mold core member;

(c) closing said tire mold with said collapsible tire core member being spaced from said side plates and said outer ring to define a cavity of generally tire shape;

(d) charging a liquid reaction mixture into said cavity to form a tire body and at least partially curing said tire body and further curing said outer ring to adhere said body to said outer ring; and (e) opening said tire mold and collapsing said core member to remove the tire from said mold.

In accordance with a further aspect of this invention, a method is provided of preparing a reinforced tire of liquid reaction material in a tire mold, said mold having a pair of side plates, and a collapsible radially inner tire mold core member which comprises the steps of:

(a) preparing an outer ring of a tread belt member in a tread mold with a removable, generally cylindrical tread mold core member and a radially outer shell member positioned radially outward of the surface of said core member to define a cavity between said shell member and said core member including the steps of:

(1) mounting a spacer band with a radially outer groove thereon around a radially outer surface of said tread mold core member.

(2) wrapping a reinforcing cord around said spacer band and in said groove, (3) positioning said outer shell member radially outward of said tread mold core member to define an outer cavity between said band and said outer shell member, (4) charging a liquid reaction mixture into said outer cavity and partially curing said mixture to form an outer polymeric ring of said tread belt member adhered to said reinforcing cord, (5) collapsing and removing said tread mold core member and said spacer band from said outer shell member containing said outer polymeric ring and reinforcing cord, (6) positioning a collapsible tread mold core member adjacent said outer shell member to define an inner cavity between said outer polymeric ring and said tread mold core member, (7) charging a liquid reaction mixture into said inner cavity to form an inner polymeric ring of said tread belt, (8) partially curing said inner ring and said outer ring at a predetermined temperature to adhere said inner ring to said outer ring, (9) removing said tread belt from said collapsible tread mold core member and said outer shell member,

(10) mounting said tread belt between said pair of side plates in an outer tread ring of said tire mold;

(b) closing said tire mold with said collapsible tire core member being spaced from said side plates and said tread belt to define a cavity of generally tire shape;

(c) charging a liquid reaction mixture into said cavity to form a tire body and at least partially curing said tire body and further curing said tread belt to adhere said body to said tread belt; and (d) opening said tire mold and collapsing said tire mold core member to remove the tire from said tire mold.

In accordance with a still further aspect of this invention, a method is provided of positioning a reinforcing cord in spaced relation between radially inner and outer surfaces of an annular mold which comprises the steps of:

(a) charging a liquid reaction mixture into a spacer band mold having a generally cylindrical radially inner collapsible core member and an outer shell with a helical rib on the radially outer molding surface (b) partially curing said mixture to form said band;

(c) removing said outer shell;

(d) wrapping a reinforcing cord in the groove formed by said helical rib in said outer shell;

(e) positioning said spacer band in said annular mold radially inward of said outer mold surface to define a cavity between said radially outer surface of said spacer band and said radially outer mold surface.

In accordance with another aspect of this invention, a method is provided of preparing a reinforced annular shaped article of elastomeric material in a mold, said mold having a radially outer shell member which method comprises the steps of:

(a) wrapping a layer of reinforcing cord around the radially outer surface of a spacer band;

(b) positioning said outer shell member radially outward and in spaced relation to said radially outer surface of said spacer band to define a cavity between said spacer band and said shell member;

(c) charging a liquid reaction mixture into said cavity to form and partially cure an outer polymeric ring of said article and adhere said outer polymeric ring to said layer of reinforcing cord by striking through said layer and encapsulating said cord by said liquid reaction mixture;

(d) removing said spacer band from said mold;

(e) wrapping a second layer of reinforcing cord around the radially outer surface of an annular second spacer band;

(f) positioning said second spacer band in said mold radially inward of said outer polymeric ring and with the radially outer surface in spaced relation to said outer polymeric ring to define a second cavity between said outer polymeric ring and said second spacer band;

(g) charging a liquid reaction mixture into said second cavity to form and partially cure an intermediate polymeric ring of said article and to further cure said outer polymeric ring to provide a bond therebetween and adhere said intermediate polymeric ring to said second layer of reinforcing cord by striking through and encapsulating said cord on said second spacer band;

(h) removing said second spacer band from said mold;

(i) positioning a cylindrical collapsible core member in said mold radially inward and in spaced relation to said intermediate polymeric ring to define a third cavity between said intermediate polymeric ring and said core member for molding an innermost polymeric ring of said article;

(j) charging a liquid reaction mixture into said third cavity to form said innermost polymeric ring and simultaneously cure said innermost polymeric ring, said intermediate polymeric ring and said outer polymeric ring and provide a bond between said intermediate polymeric ring and said inner polymeric ring; and (k) removing said core member and said outer shell member from said annular article reinforced by said first-mentioned layer of reinforcing cords and said second layer of reinforcing cords at radially spaced positions therein.

To the accomplishment of the foregoing and related ends, the invention, then, comprises the features hereinafter fully described and particularly pointed out in the claims, the following description and the annexed drawings setting forth in deetail certain illustrative embodiments of the invention, these being indicative, however, of but several of the various ways in which the principles of the invention may be employed.

DETAILED DESCRIPTION

Figure 12:
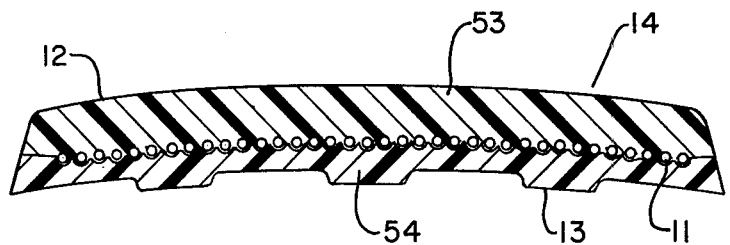
FIG. 12 is a sectional view like FIG. 11 showing the tread belt after removal from the tread belt mold.

In accordance with the present invention, an annular spacer band 10 is utilized to position a reinforcing cord such as wire cable 11 in a predetermined spaced position from a tread surface 12 and a tireengaging surface 13 of a tire component such as tread belt 14, shown in FIG. 12. For an off-the-road tire, it is desirable to have a separable tread belt 14 of a relatively light material such as polyurethane which is reinforced by wire cable 11 helically wound around the tread belt 14.

Figure 1:
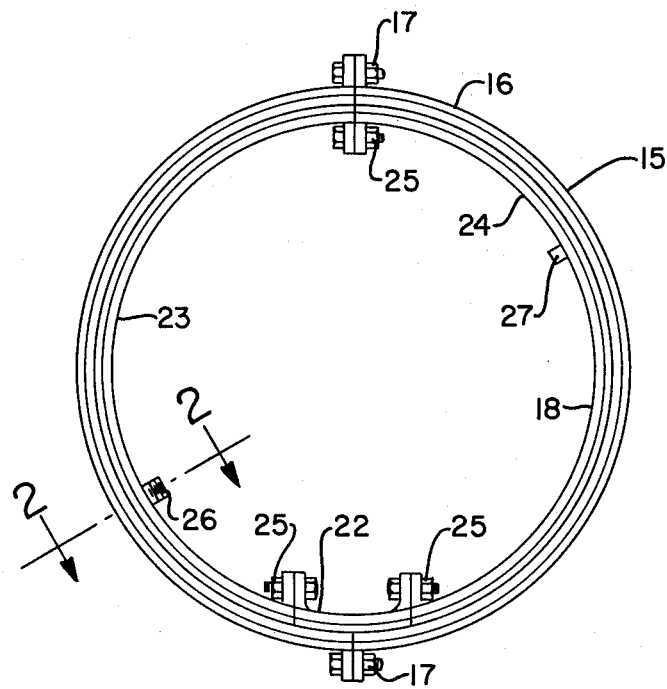
FIG. 1 is a schematic plan view of the mold for a spacer band.
Figures 2, 3:
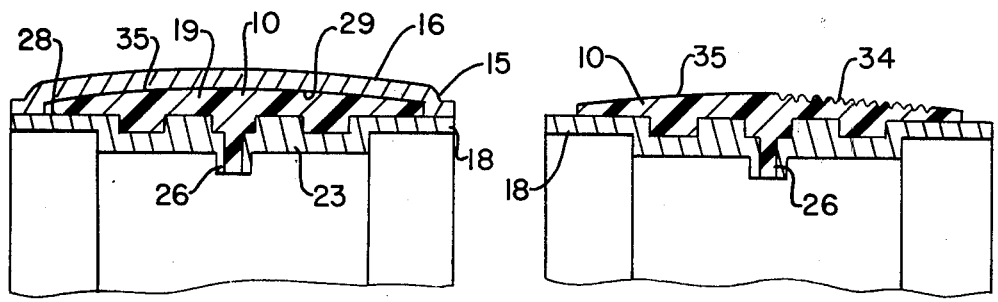
FIG. 2 is a fragmentary sectional view taken along the plane of line 2—2 in FIG. 1.
FIG. 3 is a sectional view like FIG. 2 with the outer shell of the mold removed and a groove partially cut in the outer surface of the spacer band.
Figure 4:
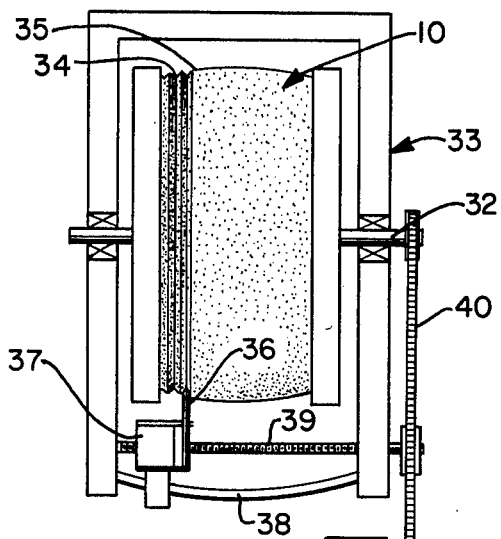
FIG. 4 is a schematic plan view of a wire wrapping machine with a cutting tool for cutting a groove in the outer surface of the spacer band.

Referring to FIGS. 1 and 2, a spacer band mold 15 has a radially outer shell member 16 which may be made of two semicircular members bolted together by fasteners such as bolts and nuts 17 extending through flanges at the ends of the semicircular members. A collapsible, generally cylindrical, radially inner core member such as core 18 is mounted in abutting relationship to the shell member 16 defining a mold cavity 19 for the spacer band 10. The core 18 may have three or more segments such as key segment 22 and core segments 23 and 24, all of which are held together by fasteners such as bolts and nuts 25 extending through flanges on the segments. The core segment 23 may have an inlet 26 positioned at the lowest portion of the mold cavity 19 connected by a conduit to a pressure pot (not shown). The core segment 24 may have an outlet 27 positioned at the highest portion of the mold cavity 19 which can be connected to a vacuum source and be located at a position diametrically opposite to the inlet 26.

The spacer band 10 is formed in the spacer band mold 15 preferably by charging the mold with a liquid elastomer precursor, such as a liquid polyurethane reaction mixture, and then curing the mixture. For example, radially outer surface 28 of the core 18 may be treated with a suitable mold release. Radially inner surface 29 of shell member 16 may also be treated with this same mold release prior to closing the mold. These parts can then be preheated to about 175° F. (79° C.). An isocyanate (NCO) terminated prepolymer may then be heated to 175° F. (79° C.) and degassed under vacuum. A suitable prepolymer may, for example, be of the type prepared by reacting polytetramethylene ether glycol of molecular weight of about 2000 with a stoichiametric excess of toluene diisocyanate. The toluene diisocyanate is typically a 65/35 mixture of 2,4-/2,6-toluene diisocyanates. A curative such as 2,2'-dithiodianiline in an amount 0.86 molecular amine units per unit of unreacted isocyanate may then be melted at 230° F. (110° C.) and the prepolymer and curative mixed in a container after which the mixture is forced into the mold 15 under a pressure of up to about 40 psig from a pressure pot. During the charging of this liquid reaction mixture into the mold 15 a vacuum may be applied at the outlet 27. After about two hours in the mold at about 175° F. (79° C.), the spacer band 10 is partially cured to the extent that it is flexible, exhibits a dimensional stability and is soft enough to be easily cut with a knife.

The outer shell member 16 is then removed by unfastening the bolts and nuts 17 holding the semicircular members of the shell member 16 together. The core 18 with the spacer band 10 may then be mounted for rotation about a shaft 32 of a wire wrapping machine 33 which is adapted to cut a groove 34 in a radially outer surface 35. A knife or other suitable cutting tool 36 is mounted on a carriage 37 which slides on a curved rail 38 and is moved across the surface 35 of the spacer band 10 by a screw 39 in threaded engagement with a nut (not shown) in the carriage 37. A chain drive 40 connected to a power source rotates the screw 39 and shaft 32 so that the cutting tool 36 will move at a speed proportional to the speed of rotation of the shaft to cut the helical groove 34 in the outer surface 35 of the spacer band 10. The curved rail 38 preferably has the same curvature as the curvature of the outer surface 35 of the spacer band 10 and it can be seen that with this apparatus, the helical groove 34 may be cut to conform with different curvatures of the outer surface of the spacer band and to provide different spacing between the turns of wire cable 11. In the embodiment shown, the wire cable 11 is spaced eight turns per inch.

Figure 5:
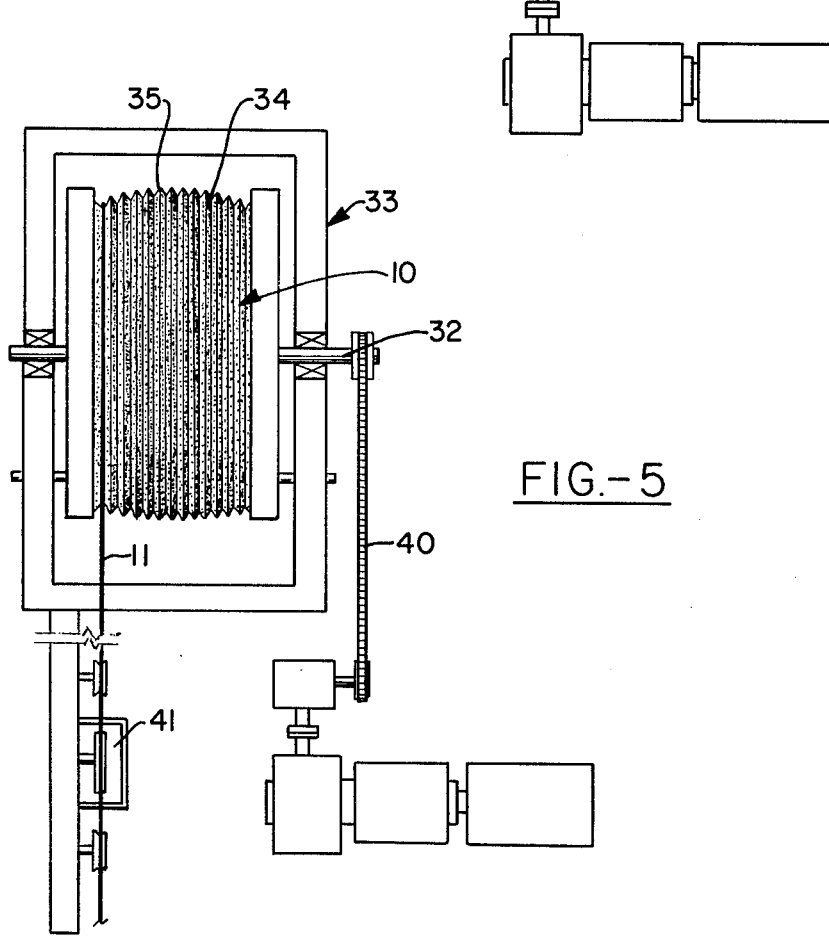
FIG. 5 is a schematic plan view like FIG. 4 of the wire wrapping machine showing the winding of the wire on the grooved surface of the spacer band.

After the groove 34 is cut, the wire wrapping machine 33 may be used to wrap the wire cable 11 around the spacer band 10 in the helical groove as shown in FIG. 5. Prior to wrapping the cord of wire cable 11, the outer surface 35 of the spacer band 10 is treated with a mold release material. The cable 11 may then be precoated with a suitable adhesive such as Chemloc 218 diluted 50 percent with methylethyl ketone by running the wire under tension through an adhesive dip unit 41 and drying the wire prior to wrapping in the groove 34. The wire wrapping machine 33 may have tension control capability if desired. The ends of the wire cable 11 may be fastened together, if desired, by suitable means such as clamping or soldering. The resulting assembly, shown in FIG. 6, includes the spacer band 10 mounted on the core 18 with the wire cable 11 in the groove 34. An opening 42 may be provided in the spacer band 10 to provide for charging liquid polyurethane reaction mixture through the inlet 26 and spacer band 10.

Figure 7:
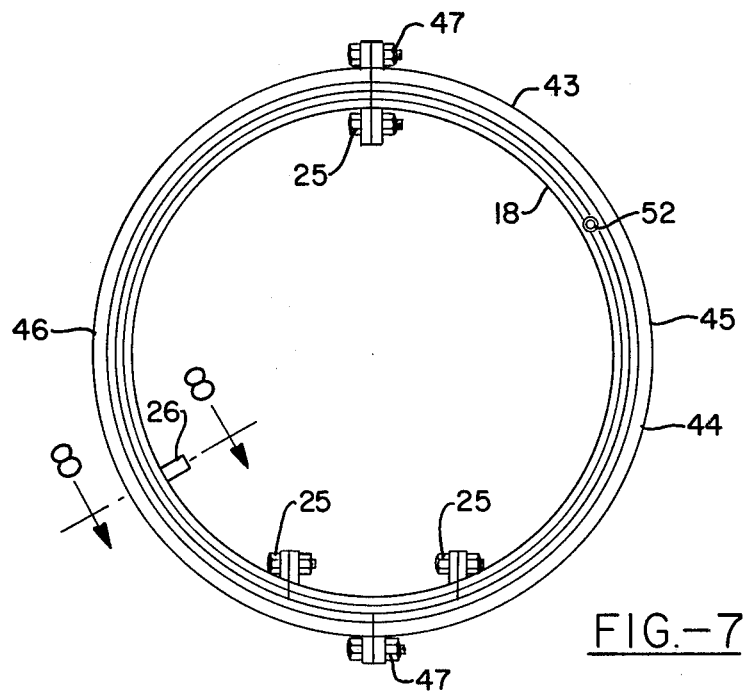
FIG. 7 is a schematic plan view of a tread belt mold.
Figure 8:
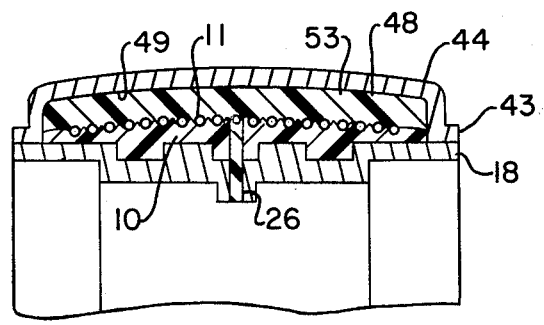
FIG. 8 is a fragmentary sectional view taken along the plane of line 8—8 in FIG. 7 showing the outer tread ring formed in the outer shell of the tread belt mold in the cavity between the spacer band and outer shell.

The core 18 of the spacer band mold 15 also may be the core of the tread mold 43 as shown in FIG. 7. An outer shell 44 of the tread mold 43 is segmented and may have semicylindrical segments 45 and 46 fastened together by bolts and nuts 47 and engageable with the core 18 to define a cavity 48 for forming an annular reinforced body such as tread belt 14 of liquid polyurethane reaction mixtures. Radially inner surface 49 of tread mold outer shell 44 may be treated with a mold release. Diametrically opposed from the inlet 26 which is preferably positioned at the lowest portion of the cavity 48 of the mold 43, an outlet 52 is provided in the segment 45 at the parting line between the outer shell 44 and core 18 which is preferably positioned at the highest portion of the mold cavity. The outlet 52 may be connected to a vacuum source (not shown). The inlet 26 is connected to a pressure pot (not shown) which is filled with a liquid polyurethane reaction mixture and charged into the tread mold 43 at a pressure of 40 psig providing a strike through and encapsulation of the cable 11. The entire tread mold 43 including the injected liquid mixture is heated for about one hour at 200° F. (93° C.) to partially cure the mixture to form an outer polymeric ring 53 of the tread belt 14.

Figure 9:
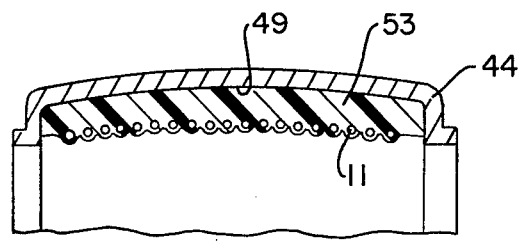
FIG. 9 is a fragmentary sectional view like FIG. 8 showing the outer ring of the tread belt in the outer shell of the tread belt mold with the core and spacer band removed.

By removing the bolts and nuts 25 from the core 18, it may be collapsed and pulled out of the spacer band 10 and then the flexible spacer band may be pulled away from outer ring 53 of the tread belt 14 which is partially cured in the outer shell 44 and adhered to the wire cable 11 through encapsulation of the cable as shown in FIG. 9.

Figure 10:
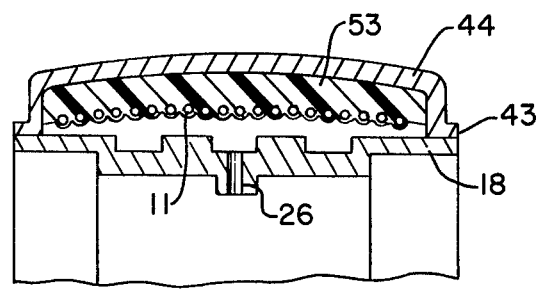
FIG. 10 is a fragmentary sectional view like FIG. 9 showing the collapsible core mounted inside the outer shell of the tread belt mold.
Figure 11:
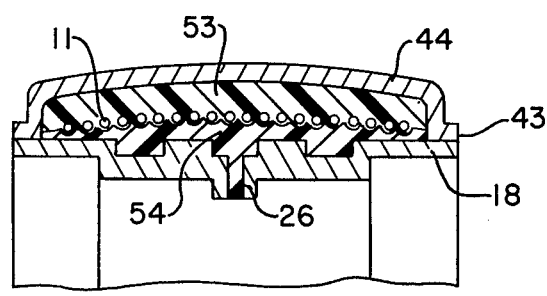
FIG. 11 is a fragmentary sectional view like FIG. 10 showing the inner ring of the tread belt formed in the mold.

A mold release is then applied to the core 18 and the core mounted within the outer shell 44 as shown in FIG. 10. The liquid polyurethane reaction mixture can be prepared, for example, at a temperature of about 175° F. (79° C.) to 220° F. (104° C.) and then placed in the pressure pot for charging the cavity between the outer ring 53 and core 18 to form an inner polymeric ring 54 of the tread belt 14 as shown in FIG. 11. The inner ring 54 and outer ring 53 can then be cured and thereby bonded together at a temperature, for example, of about 220° F. (104° C.) for about 16 hours by placing the mold 43 in an oven. After curing, the outer shell 44 is removed by removing the nuts and bolts 47 and the core 18 is collapsed and removed by removing the nuts and bolts 25 providing an annular tread belt 14 with a cross section as shown in FIG. 12. It is understood that if desired the inner ring 54 and outer ring 53 may be only partially cured in the mold 43 and then fully cured after removal from the mold.

This tread belt 14 is adapted for use as a separable tread for an off-the-road tire. The reinforcing wire cable 11 is located at predetermined distances from the tread surface 12 and from the tire-engaging surface 13 depending upon the thickness of the spacer band 10. In the present embodiment, the wire cable 11 is equidistant along its full extent from the tread surface 12 even though the tread surface has a curvature. It can be seen that where desired, the wire cable 11 may be spaced at a greater or lesser distance from the tread surface 12 at different positions across the tread belt 14 to obtain the desired wear and operating characteristics.

Figure 13:
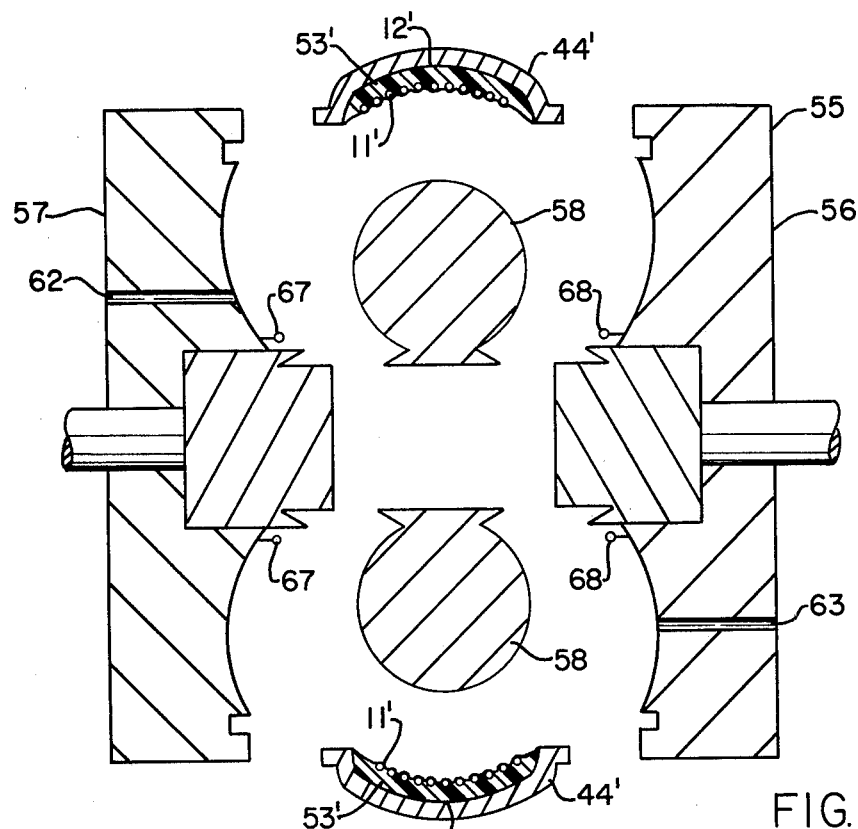
FIG. 13 is a schematic fragmentary sectional view of a tire mold for a modification of the invention showing the mold in the open condition and the outer shell of the tread belt mold forming part of the tire mold and containing the outer ring of the tread belt with the reinforcing wire cable held in spaced relationship from the tread surface.
Figure 14:
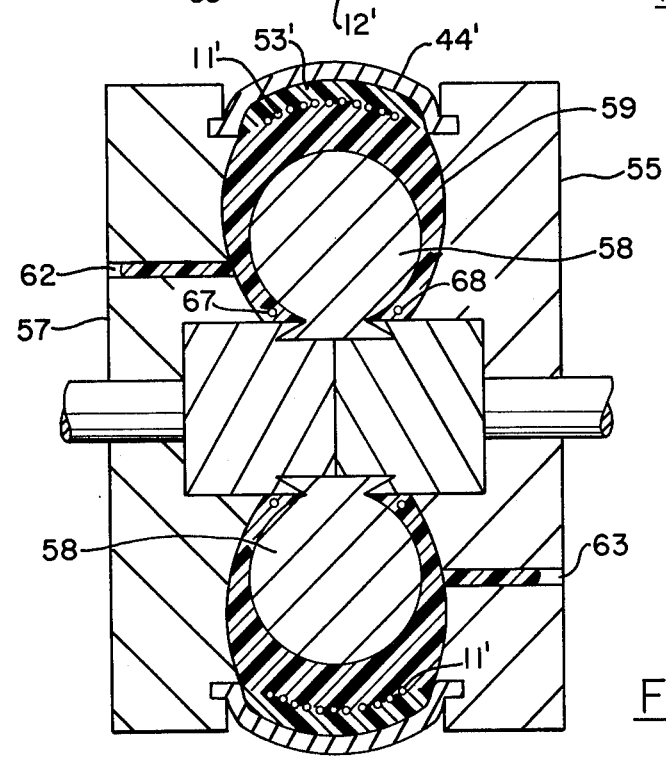
FIG. 14 is a fragmentary schematic sectional view like FIG. 13 showing the tire mold closed and the remainder of the tire body mixture as charged into the mold.

Referring to FIGS. 13 and 14, a modification of the present invention is shown for preparing a pneumatic tire out of a liquid polyurethane reaction mixture with wire cable 11' at a predetermined distance from the tread surface 12' by utilizing the outer shell 44' as part of a tire mold 55. The outer shell 44' may be positioned between side plates 56 and 57 mounted for relative axial movement into and out of engagement with the outer shell.

A collapsible core 58, shown schematically in FIGS. 13 and 14, has segments which are movable radially for positioning within the mold 55 and removal from a molded tire 59 as shown in FIG. 14.

An inlet 62 is provided in the side plate 57 and may be connected to a pressure pot (not shown). An outlet 63 may be provided in the other side plate 56 at a diametrically opposed position to the inlet 62 and is connected to a vacuum source (not shown). The method of making the tire 59 includes the steps set forth above to form and partially cure the outer ring 53' of the tread belt as shown in FIG. 9. The outer shell 44' is then placed between the side plates 56 and 57 and over the core 58 as shown in FIG. 13. The core 58 and side plates 56 and 57 are treated with a mold release material and preheated. The side plates 56 and 57 are then moved axially towards each other and the core 58 moved radially outward to form a ring within the mold cavity. The liquid polyurethane elastomer reaction mixture is prepared as described above and placed in the pressure pot where it is charged under pressure or gravity fed into the mold cavity of the tire mold 55 during injection molding or spin casting of the tire. Meanwhile vacuum is applied at the outlet 63. During partial curing of the liquid reaction mixture there will be additional curing of the outer ring providing a bond between the outer ring and tire body. The mold 55 may then be maintained at a desired temperature of about 220° F. (104° C.) for approximately 16 hours after which the tire 59 is removed. Removal of the tire 59 is accomplished by separating the side plates 56 and 57, retracting the segments of the core 58 from the tire, and then removing the bolts and nuts 47' from the shell 44' to separate the shell from the tread of the tire.

Figure 15:
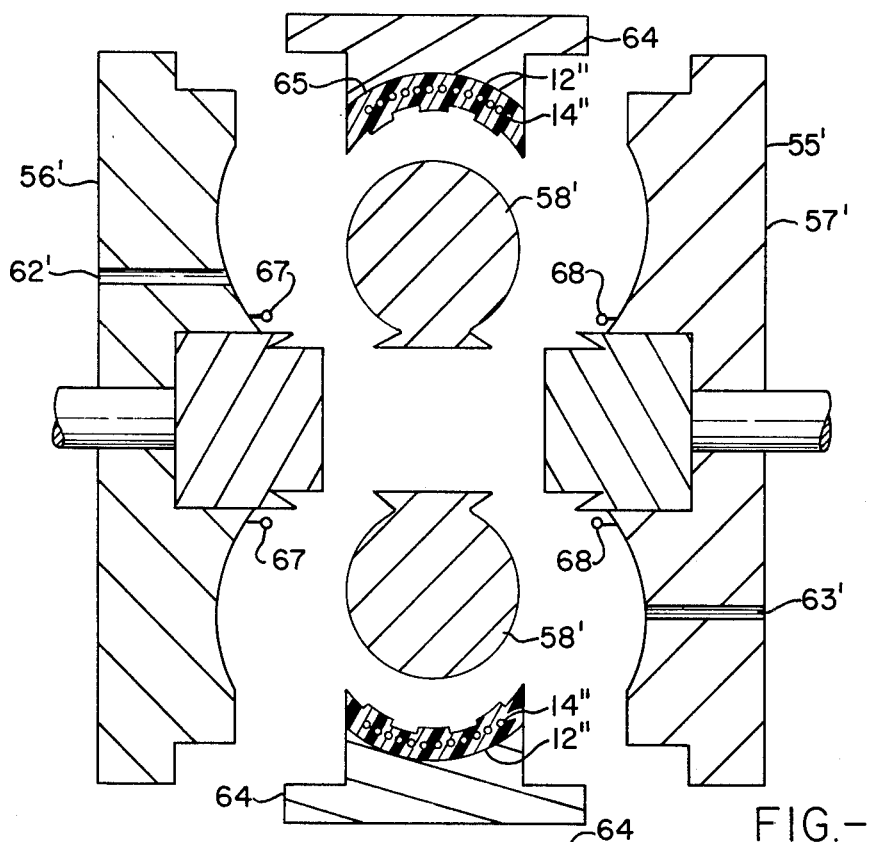
FIG. 15 is a schematic cross-sectional view of a tire mold for another modificaion of the invention showing the mold in the open condition and a tread belt held in an outer mold ring.
Figure 16:
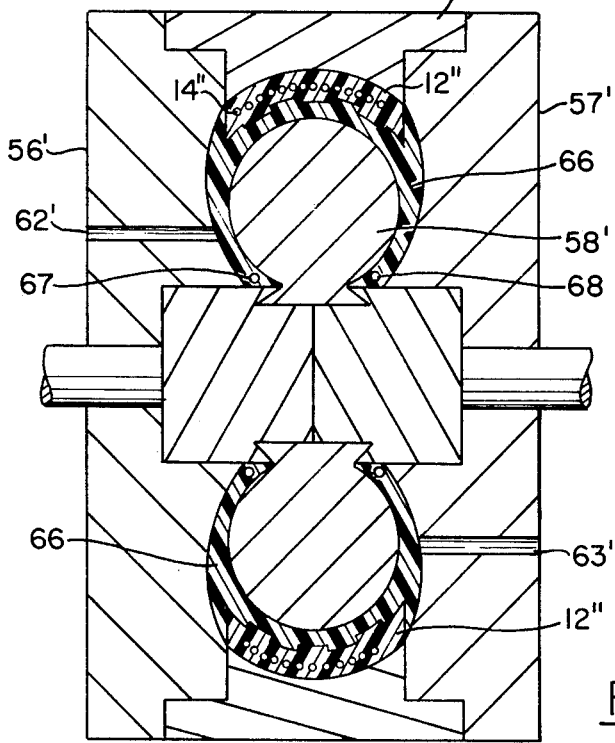
FIG. 16 is a schematic sectional view like FIG. 15 but showing the mold closed and the remainder of the tire body mixture as charged into the mold.

Another modification is shown in FIGS. 15 and 16 where the tire mold 55' is designed to incorporate the entire tread belt 14" in a tire prepared by forming and partially curing a liquid polyurethane reaction mixture. The side plates 56' and 57' are substantially the same as the side plates in the modification of FIGS. 13 and 14. However, a tread ring 64, which may be semicylindrical and held together by fasteners such as those described for the outer shell 44 hereinabove is positioned between the side plates 56' and 57' and has a radially inner surface 65 adapted to receive the outer tread surface 12" of the tread belt 14". In operation, the side plates 56' and 57' are moved axially towards one another and the core 58' moves radially outward to define a cavity for forming a tire 66 containing the tread belt 14". In both this embodiment and the embodiment of FIGS. 13 and 14, beads 67 and 68 are fastened to the side plates for inclusion in the tires 59 and 66. In operation, the tire 66 is prepared in the same manner as described for preparing the tire 59 so that there is further curing of the tread belt 14" for adherence to the body of the tire.

Figure 17:
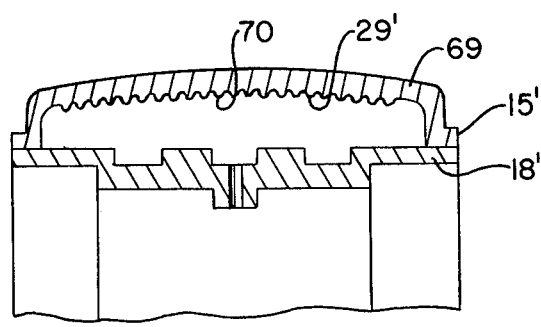
FIG. 17 is a fragmentary sectional view of a modified spacer band mold having a helical rib on the radially inner surface of the outer shell.
Figure 18:
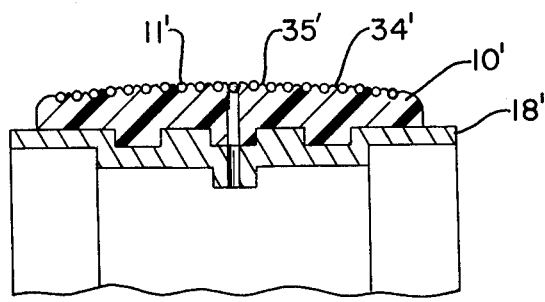
FIG. 18 is a fragmentary sectional view like FIG. 17 with the outer shell removed and a reinforcing wire wound in the grooves of the spacer band.

Referring to FIGS. 17 and 18, a modification is shown for making the spacer band 10' in which an outer shell 69 of the spacer band mold 15' has a radially inner surface 29' with a helical rib 70 cut in the surface or formed on the surface as a raised rib so that upon forming and the complete curing of the band 10' the groove 34' will be molded in the radially outer surface 35' of the spacer band as shown in FIG. 18. In this way the steps of cutting the groove 34' in the spacer band 10' are eliminated. The wrapping of the wire cable 11' may be accomplished on the wire wrapping machine 33 in a similar manner to that described hereinabove.

Figure 19:
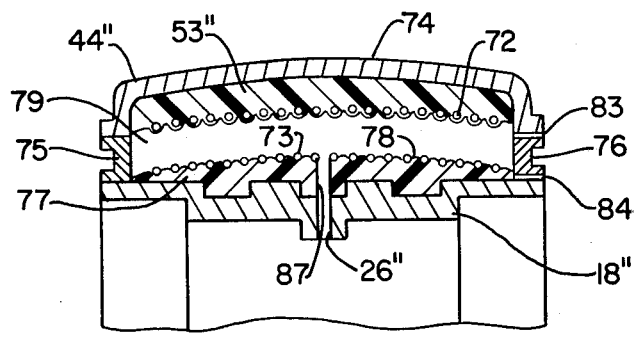
FIG. 19 is a fragmentary sectional view of a tread belt mold for a tread belt having two layers of cords showing the outer ring with the outer layer of cords and a second spacer band supporting an inner cord layer.
Figure 20:
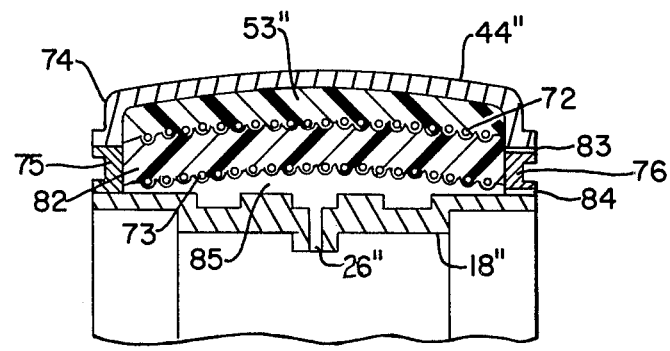
FIG. 20 is a view like FIG. 19 but showing the inner cord layer supported by a second ring and with the spacer band removed to define a cavity for charging the mold with liquid reaction mixture to form the innermost ring.
Figure 21:
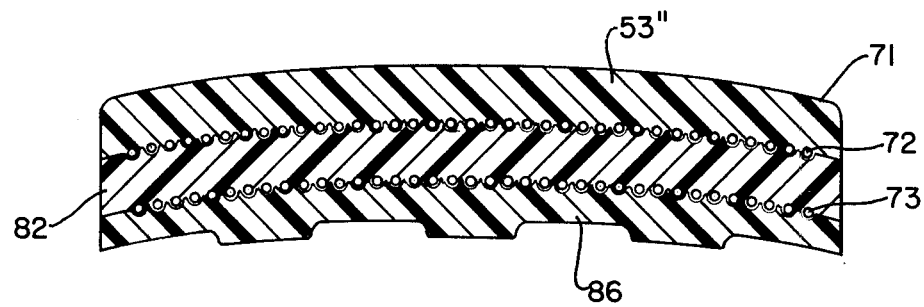
FIG. 21 is a sectional view showing the tread belt after removal from the tread belt mold of FIGS. 19 and 20.

Referring to FIGS. 19, 20 and 21, a further modification is illustrated in which an outer tread belt 71, shown in FIG. 21, has an outer reinforcing cord layer 72 and a spacer inner reinforcing cord layer 73 where the reinforcing cord can be a wire cable. An outer polymeric ring 53" of elastomeric polyurethane material having the outer layer of wire cord is prepared in an outer shell 44" in the same manner as described hereinabove for the preparation of outer ring 53 for the embodiment shown in FIG. 9. The partially cured outer ring 53" in the outer shell 44" is mounted in a tread belt mold 74 having mold spacer rings 75 and 76 interposed between a core 18" and the outer shell.

Figure 6:
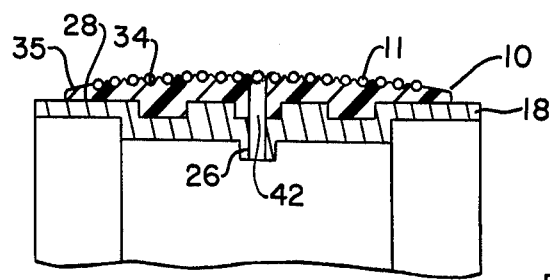
FIG. 6 is a sectional view like FIG. 3 showing the wire wound in the groove of the surface of the spacer band.

An annular flexible spacer band 77 prepared in the same manner as the spacer band 10, shown in FIG. 6 and as described hereinabove, is mounted on the core 18" and has a radially outer surface 78 for supporting the wire cord of the inner reinforcing cord layer 73 in spaced relation to the wire cord of outer cord layer 72 to define a cavity 79 for preparing an intermediate ring 82 of the tread belt 71. The core 18" may have three or more segments with one of the segments having an inlet 26' connected by a conduit to a pressure pot (not shown). The tread belt mold 74 may have an intermediate outlet 73 and an inner outlet 84. The intermediate outlet 83 is located at the parting line between the spacer ring 76 and outer shell 44" and the inner outlet 84 is located at the parting line between the spacer ring and the core 18". The spacer band 77 may have an opening 87 in alignment with inlet 26" for charging into the intermediate cavity 79 of the tread belt mold 74 a liquid reaction mixture at a pressure of 40 psig providing for the strike through and encapsulating of the wire cable of the innter reinforcing cord layer 73. The intermediate ring 82 is also bonded to the outer ring 53" during the simultaneous curing of the rings at a temperature of 175° F. (79° C.) for a period of about one hour to partially cure the rings.

The core 18" is disassembled and the flexible spacer band 77 pulled away from the intermediate ring 82 which is adhered to the outer ring 53" and to the inner reinforcing cord layer 73 by striking through and encapsulating the cable as shown in FIG. 20.

A mold release is then applied to the core 18" and the core mounted within the mold spacer rings 75 and 76 to define a cavity 85 for innermost ring 84 of the tread belt 71. The liquid polyurethane reaction mixture is prepared at a temperature of about 175° F. (79° C.) for the prepolymer and 220° F. (104° C.) for the curative and then placed in the pressure pot for charging into the cavity 85 between the intermediate ring 82 and the core 18" to form the innermost ring 86 of the tread belt 71 as shown in FIG. 21. The innermost ring 84, intermediate ring 82 and outer ring 53" are then simultaneously cured and thereby bonded together at about 220° F. (104° C.) for about 16 hours by placing the mold 74 in an oven. After curing, the mold spacer rings 75 and 76 and the outer shell 44" are removed as described hereinabove. Also the core 18" is removed in the same manner providing an annular tread belt 71 with two layers 72 and 73 of reinforcing wire cords.

By varying the diameter of the radially outer surface 78 of the spacer band 77, the distance between the outer reinforcing cord layer 72 and the inner reinforcing cord layer 73 can be varied. Also where more than two reinforcing layers are desired, they can be positively positioned in the tread belt by utilizing three or more spacer bands having radially outer surfaces of different diameters. Also cores and mold spacer rings of different diameters can be utilized to obtain the desired spacing.

In describing the spacer bands, the preferred material for the embodiments shown and described has had sufficient flexibility for easy removal from a mold without distorting or damaging rings molded radially outward of the bands. It is understood, however, than in these and other applications of the invention the spacer bands may be of a different material but be made collapsible by segmentation of the bands or other suitable collapsible construction.

While certain representative embodiments and details have been shown for the purpose of illustrating the invention, it will be apparent to those skilled in the art that various changes and modifications may be made therein without departing from the spirit or scope of the invention.

We claim:

1. A method of preparing a reinforced annular shaped article of elastomeric material in a mold, said mold having a generally cylindrical collapsible radially inner core member and a shell member positioned radially outward of the surface of said core member to define a cavity between said shell member and said core member, which method comprises the steps of:
   (a) mounting a spacer band with a radially outer groove thereon around the radially outer surface of said core member;
   (b) wrapping a reinforcing cord around said spacer band and in said groove;
   (c) positioning said outer shell member radially outward of said core member to define an outer cavity between said band and said outer shell member;

(d) charging a liquid reaction mixture into said outer cavity and at least partially curing said mixture to form an outer polymeric ring of said article adhered to said reinforcing cord;

(e) collapsing and removing said inner collapsible core member and said spacer band from said outer shell member containing said outer polymeric ring and reinforcing cord;

(f) positioning said collapsible core member radially inward of said outer shell member to define an inner cavity between said outer polymeric ring and said core member;

(g) charging a liquid reaction mixture into said inner cavity and at least partially curing said mixture to form an inner polymeric ring of said article adhered to said reinforcing cord and said outer polymeric ring while further curing said outer ring; and (h) removing said core member and said outer shell member from said cord-reinforced annular shaped article.

2. The method of claim 1 wherein said reinforcing cord is a wire cable.

3. The method of claim 2 wherein said wire cable is precoated with an adhesive before wrapping of said cable around said spacer band.

4. The method of claim 1 wherein said spacer band is of cast elastomeric material with a continuous helical groove in the radially outer surface.

5. The method of claim 4 wherein said groove has about eight turns per inch.

6. The method of claim 1 wherein a mold release material is applied to the groove of said spacer band prior to wrapping said reinforcing cord around said spacer band.

7. The method of claim 1 wherein the thickness of said spacer band measured in the radial direction of said mold is varied in an axial direction of said mold to provide a different reinforcement at different positions spaced axially of said article.

8. The method of claim 1 wherein said annular reinforced article is a separable tire tread belt for an off-the-road torus tire, said outer polymeric ring includes the tread portion, said inner polymeric ring is engageable with said tire and said reinforcing cord prevents circumferential growth and distributes the stresses throughout the tread belt.

9. The method of claim 1 wherein said mixture strikes through and encapsulates said reinforcing cord for adherence of said outer polymeric ring to said reinforcing cord.

10. The method of claim 1 wherein said liquid reaction mixture is heated to a predetermined temperature to partially cure said outer polymeric ring and said inner polymeric ring.

11. The method of claim 1 wherein said spacer band is of flexible material for facilitating removal from said outer polymeric ring.

12. A method of preparing a reinforced annular tire of elastomeric material in a tire mold, said mold having a pair of side plates, and a collapsible radially inner tire mold core member which comprises the steps of:

(a) preparing an outer ring of a tread belt member in a tread mold with a removable, generally cylindrical tread mold core member and a radially outer shell member positioned radially outward of the surface of said core member to define a cavity between said shell member and said core member including the steps of:

(1) mounting a spacer band with a radially outer groove thereon around a radially outer surface of said tread mold core member, (2) wrapping a reinforcing cord around said spacer band and in said groove, (3) positioning said outer shell member radially outward of said tread mold core member to define an outer cavity between said band and said outer shell member, (4) charging a liquid reaction mixture into said outer cavity and partially curing said mixture to form an outer polymeric ring of said tread belt member adhered to said reinforcing cord, (5) collapsing and removing said tread mold core member and said spacer band from said outer shell member containing said outer polymeric ring and reinforcing cord;

(b) positioning said outer shell member between said pair of side plates and around said collapsible tire mold core member;

(c) closing said tire mold with said collapsible tire core member being spaced from said side plates and said outer ring to define a cavity of generally tire shape;

(d) charging a liquid reaction mixture into said cavity to form a tire body and at least partially curing said tire body and further curing said outer ring to adhere said body to said outer ring; and (e) opening said tire mold and collapsing said core member to remove the tire from said mold.

13. The method of claim 12 wherein said cords are of wire cable.

14. The method of claim 13 wherein said wire cable is coated with adhesive before wrapping of said cable around said spacer band.

15. The method of claim 12 wherein said spacer band is of cast liquid reaction mixture with a groove in the radially outer surface.

16. The method of claim 12 wherein annular bead rings are supported by said side members for molding in said tire during the step of charging a liquid reaction mixture into said cavity.

17. A method of preparing a reinforced tire of liquid reaction material in a tire mold, said mold having a pair of side plates, and a collapsible radially inner tire mold core member which comprises the steps of:

(a) preparing an outer ring of a tread belt member in a tread mold with a removable, generally cylindrical tread mold core member and a radially outer shell member positioned radially outward of the surface of said core member to define a cavity between said shell member and said core member including the steps of:

(1) mounting a spacer band with a radially outer groove thereon around a radially outer surface of said tread mold core member, (2) wrapping a reinforcing cord around said spacer band and in said groove, (3) positioning said outer shell member radially outward of said tread mold core member to define an outer cavity between said band and said outer shell member, (4) charging a liquid reaction mixture into said outer cavity and partially curing said mixture to form an outer polymeric ring of said tread belt member adhered to said reinforcing cord, (5) collapsing and removing said tread mold core member and said spacer band from said outer shell member containing said outer polymeric ring and reinforcing cord, (6) positioning a collapsible tread mold core member adjacent said outer shell member to define an inner cavity between said outer polymeric ring and said tread mold core member, (7) charging a liquid reaction mixture into said inner cavity to form an inner polymeric ring of said tread belt.

(8) partially curing said inner ring and said outer ring at a predetermined temperature to adhere said inner ring to said outer ring, (9) removing said tread belt from said collapsible tread mold core member and said outer shell member,

(10) mounting said tread belt between said pair of side plates in an outer tread ring of said tire mold;

(b) closing said tire mold with said collapsible tire core member being spaced from said side plates and said tread belt to define a cavity of generally tire shape;

(c) charging a liquid reaction mixture into said cavity to form a tire body and at least partially curing said tire body and further curing said tread belt to adhere said body to said tread belt; and (d) opening said tire mold and collapsing said tire mold core member to remove the tire from said tire mold.

18. A method of positioning a reinforcing cord in an annular mold which comprises the steps of:
(a) charging a liquid reaction mixture into a spacer band mold having a generally cylindrical, radially inner collapsible core member and an outer shell;
(b) partially curing said mixture to form said band;
(c) removing said outer shell;
(d) cutting a groove in the radially outer surface of said partially cured band;
(e) wrapping a reinforcing cord in said groove;
(f) positioning said spacer band in said annular mold radially inward of an annular mold surface to define a cavity between said radially outer surface and said mold surface.

19. The method of claim 18 wherein a mold release material is applied to the grooved surface of said band prior to wrapping said reinforcing cord in said groove and coating said reinforcing cord with an adhesive.

20. The method of claim 18 wherein said groove is cut by mounting said core member rotatably about an axis and engaging the surface of said band with a groove-cutting tool, moving said tool axially along said surface at a speed proportional to the speed of rotation of said band to cut a helical groove in said surface.

21. A method of positioning a reinforcing cord in spaced relation between radially inner and outer surfaces of an annular mold which comprises the steps of:
(a) charging a liquid reaction mixture into a spacer band mold having a generally cylindrical radially inner collapsible core member and an outer shell with a helical rib on the radially outer molding surface;
(b) partially curing said mixture to form said band;
(c) removing said outer shell;
(d) wrapping a reinforcing cord in the grooved formed by said helical rib in said outer shell;
(e) positioning said spacer band in said annular mold radially inward of said outer mold surface to define a cavity between said radially outer surface of said spacer band and said radially outer mold surface.

22. The method of claim 21 wherein said radially inner mold surface of said outer shell is generally curved so that said reinforcing cord is positioned at a variable distance from said cylindrical core member to provide the optimum strength characteristics for the molded article.

23. The method of claim 22 wherein said mold is for a tire tread with a concave cross-sectional curvature and said radially inner mold surface of said outer shell has a concave cross-sectional curvature to conform with the curvature of the tire tread so that said reinforcing cord will be equidistant from said tread surface.

24. A method of preparing a reinforced annular shaped article of elastomeric material in a mold, said mold having a radially outer shell member which method comprises the steps of:
(a) wrapping a layer of reinforcing cord around the radially outer surface of a spacer band;
(b) positioning said outer shell member radially outward and in spaced relation to said radially outer surface of said spacer band to define a cavity between said spacer band and said shell member;
(c) charging a liquid reaction mixture into said cavity to form and partially cure an outer polymeric ring of said article and adhere said outer polymeric ring to said layer of reinforcing cord by striking through said layer and encapsulating said cord by said liquid reaction mixture;
(d) removing said spacer band from said mold;
(e) wrapping a second layer of reinforcing cord around the radially outer surface of an annular second spacer band;
(f) positioning said second spacer band in said mold radially inward of said outer polymeric ring and with the radially outer surface in spaced relation to said outer polymeric ring to define a second cavity between said outer polymeric ring and said second spacer band;
(g) charging a liquid reaction mixture into said second cavity to form and partially cure an intermediate polymeric ring of said article and to further cure said outer polymeric ring to provide a bond therebetween and adhere said intermediate polymeric ring to said second layer of reinforcing cord by striking through and encapsulating said cord on said second spacer band;
(h) removing said second spacer band from said mold;
(i) positioning a cylindrical collapsible core member in said mold radially inward and in spaced relation to said intermediate polymeric ring to define a third cavity between said intermediate polymeric ring and said core member for molding an innermost polymeric ring of said article;
(j) charging a liquid reaction mixture into said third cavity to form said innermost polymeric ring and simultaneously cure said innermost polymeric ring, said intermediate polymeric ring and said outer polymeric ring and provide a bond between said intermediate polymeric ring and said inner polymeric ring; and
(k) removing said core member and said outer shell member from said annular article reinforced by said first-mentioned layer of reinforcing cords and said second layer of reinforcing cords at radially spaced positions therein.

25. The method of claim 24 wherein said curing is done at a predetermined temperature.

26. The method of claim 25 wherein said predetermined temperature is about 175° F. (79° C.).

27. The method of claim 24 wherein the curing time to partially cure said outer polymeric ring and said intermediate polymeric ring is about two hours.

28. The method of claim 24 wherein said firstmentioned spacer band has a groove on said radially outer surface and said reinforcing cord is wound around said spacer band in said groove.

29. The method of claim 24 wherein the diameter of the radially outer surface of said first-mentioned spacer band is greater than the diameter of the radially outer surface of said second spacer band to provide spacing of said first-mentioned layer of reinforcing cord from said second layer of reinforcing cord and spacing said layers from the radially outer surface of said outer polymeric ring and from the radially inner surface of said innermost polymeric ring.

* * * * *